United States Patent [19]

O'Neil et al.

[11] 4,118,005

[45] Oct. 3, 1978

[54] TIMING DEVICE FOR FLUID VALVE

[75] Inventors: Charles P. O'Neil, Milwaukee, Wis.; Adam Smorzaniuk, West Millington, N.J.; James O. Young, Waukesha, Wis.

[73] Assignee: Amerace Corporation, New York, N.Y.

[21] Appl. No.: 831,834

[22] Filed: Sep. 9, 1977

Related U.S. Application Data

[62] Division of Ser. No. 658,773, Feb. 17, 1976, Pat. No. 4,068,682.

[51] Int. Cl.[2] ........................ F16K 1/163; F16K 11/04

[52] U.S. Cl. ................................ 251/75; 137/624.11; 137/625.27

[58] Field of Search ...................... 137/624.11, 624.14, 137/625.27, 418; 251/75, 73

[56] References Cited

U.S. PATENT DOCUMENTS

| | | | |
|---|---|---|---|
| 2,606,543 | 8/1952 | Rappl | 251/75 X |
| 3,237,646 | 3/1966 | Houser | 251/75 |
| 3,336,945 | 8/1967 | Bostock | 137/624.14 |
| 3,955,791 | 5/1976 | Meckstroth | 251/75 |

*Primary Examiner*—Alan Cohan

*Attorney, Agent, or Firm*—S. Michael Bender; Ken Richardson

[57] ABSTRACT

A timing device includes a timing means which effects movement of a motion transmitting member at a selected rate to provide a timed interval of selected duration, upon expiration of which interval a snap-action mechanism, coupled to the motion transmitting member, rapidly moves a shuttle in a fluid valve from one position to another to open or close a fluid circuit.

7 Claims, 7 Drawing Figures

TIMING DEVICE FOR FLUID VALVE

This is a division of application Ser. No. 658,773, filed Feb. 17, 1976 now U.S. Pat. No. 4,068,682 issued Jan. 17, 1978.

The present invention relates generally to timing devices and pertains, more specifically, to time-delay devices of the type in which a fluid circuit is opened or closed after the lapse of a predetermined time interval following actuation of the device by a relay or some like actuating apparatus.

A variety of time-delay control apparatus is currently available in which a timing device is operated by an actuator to provide a timed interval between actuation of the timing device and the occurrence of some desired event, such as the operation of an electric switch. Among the most widely accepted of such control apparatus are those which employ a pneumatic timing device together with a solenoid actuator so that the timed interval can be measured either from activation or deactivation of the solenoid.

In certain environments, such as in the control of the flow of flammable fluids, and especially combustible gases, time-delay control apparatus is employed to open or close flow control valves. For example, fluid circuits for pilot flames in gas-burning systems are controlled by time-delay apparatus so that the fluid circuits are opened or closed after a time-delay interval measured from the occurrence of a given event, such as an interruption in gas flow. In such environments, the employment of electrical devices may present a hazard and it would be advantageous to have available a time-delay device which does not rely upon electrical components for its operation.

Pneumatic timing mechanisms which provide accurately measured intervals for time-delay purposes without the use of electrical components are especially well-suited for use in environments where electrical components are unnecessary, undesirable or dangerous. The utilization of such pneumatic timing mechanism for the control of fluids requires a reliable valve which is easily operated by a pneumatic timing mechanism to provide positive actuation between open and closed positions with no deleterious effect upon the functioning of the timing mechanism.

It is therefore an object of the invention to provide a timing device in which a valve is operated by a time-delay device to open or close a fluid circuit upon the lapse of a predetermined timed interval following actuation of the device.

Another object of the invention is to provide a snap-action valve for use in a timing device in which the valve is actuated by a time-delay mechanism to open or close a fluid circuit upon expiration of a predetermined timed interval.

Still another object of the invention is to provide a timing device employing a pneumatic time-delay mechanism to operate a valve in a fluid circuit.

A further object of the invention is to provide a timing device of the type described wherein the time-delay mechanism is actuated by a fluid actuator.

A still further object of the invention is to provide a timing device of the type described wherein the fluid circuit controlled by the valve is independent of the fluid circuit which operates the fluid actuator, whereby contamination of the fluid of one circuit by the fluid of the other circuit is precluded.

Another object of the invention is to provide a timing device of the type described wherein the timed interval between actuation of the time-delay mechanism and actuation of the valve is selectively measured from activation or deactivation of the timing device.

The above objects, as well as still further objects and advantages, are attained by the invention which may be described briefly as providing, in a timing device for actuating a fluid valve upon expiration of a prescribed timed interval following a given event, the timing device including a frame, a motion transmitting member mounted in the frame for movement along a prescribed path of travel in either one of two directions between a first location and a second location, timing means on the frame coupled with the motion transmitting member for effecting movement of the motion transmitting member at a predetermined rate in one only of said two directions to establish the timed interval between the departure of the motion transmitting member from the first location thereof and the arrival of the motion transmitting member at the second location, and permitting return movement of the motion transmitting member from the second location to the first location at an unrestricted rate, a fluid valve comprising, a valve body having a chamber, first and second passages communicating with the chamber, a shuttle in the chamber movable between a first position, wherein the shuttle closes communication between one of the first and second passages and the chamber, and a second position wherein communication is open between both the first and second passages and the chamber, and means responsive to the motion transmitting member for moving the shuttle from one to the other of the first and second positions upon the arrival of the motion transmitting member at the second location thereof.

The invention will be more fully understood, while still further objects and advantages will become apparent, by reference to the following detailed description of an embodiment of the invention illustrated in the accompanying drawing, in which.

Figure 1:
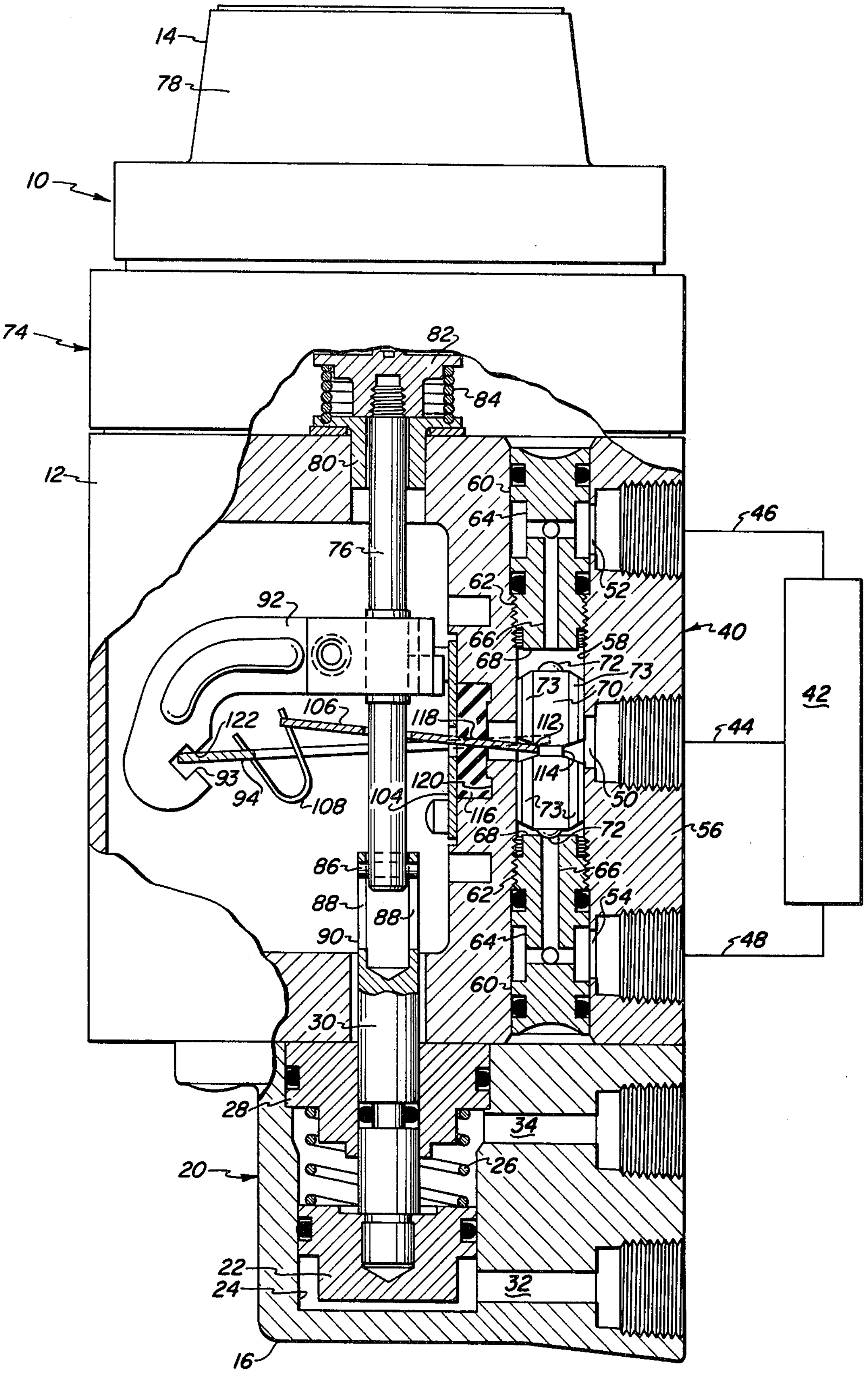
FIG. 1 is an elevational view of a timing device constructed in accordance with the invention, with portions broken away to reveal operating component parts thereof and a diagrammatic illustration of the environment in which the timing device is installed.

Referring now to the drawing, and especially to FIG. 1 thereof, a timing device constructed in accordance with the invention is illustrated at 10. Timing device 10 has a frame 12 extending longitudinally between an upper end 14 and a lower end 16 of the device.

Actuator means is shown in the form of a fluid actuator 20 at the lower end 16 of the timing device 10. Actuator 20 includes a piston 22 placed in a cylinder 24 for reciprocating movement in longitudinally upward and downward directions. Piston 22 is biased downwardly by a helical spring 26 which extends between the piston and a gland 28 which closes the cylinder 24 at the uppermost end thereof. An actuator rod 30 is affixed to the piston 22 and extends longitudinally upwardly through the gland 28, the actuator rod 30 being movable relative to the gland with movement of the piston. An inlet port 32 is provided for admitting a working fluid to the cylinder 24 below the piston 22 so as to urge the piston upwardly against the bias of spring 26. An alternate port 34 serves as a vent port and vents the cylinder above the piston to permit upward movement of the piston.

Figure 2:
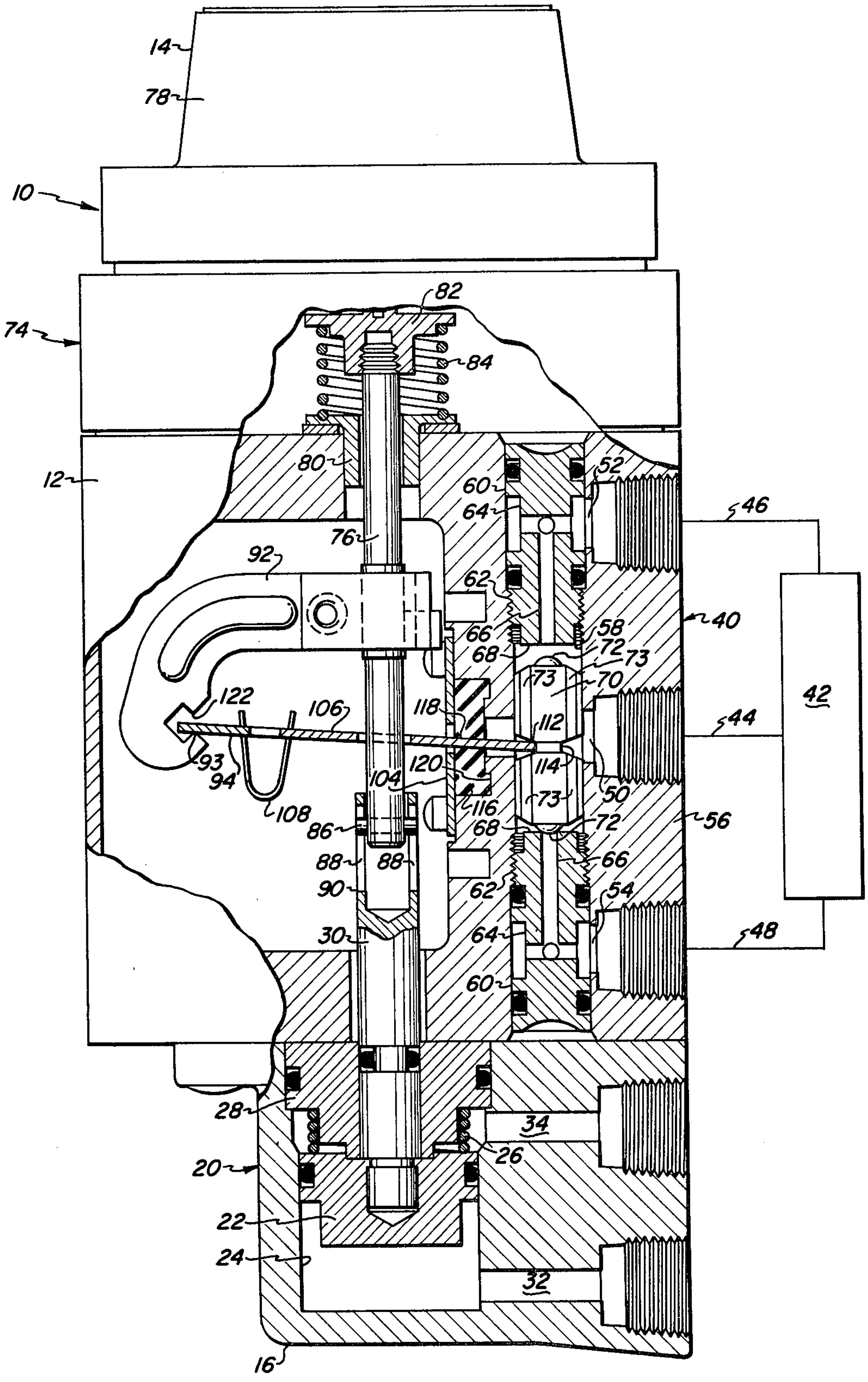
FIG. 2 is an elevational view similar to FIG. 1, but with the component parts in a different operating position.
Figure 3:
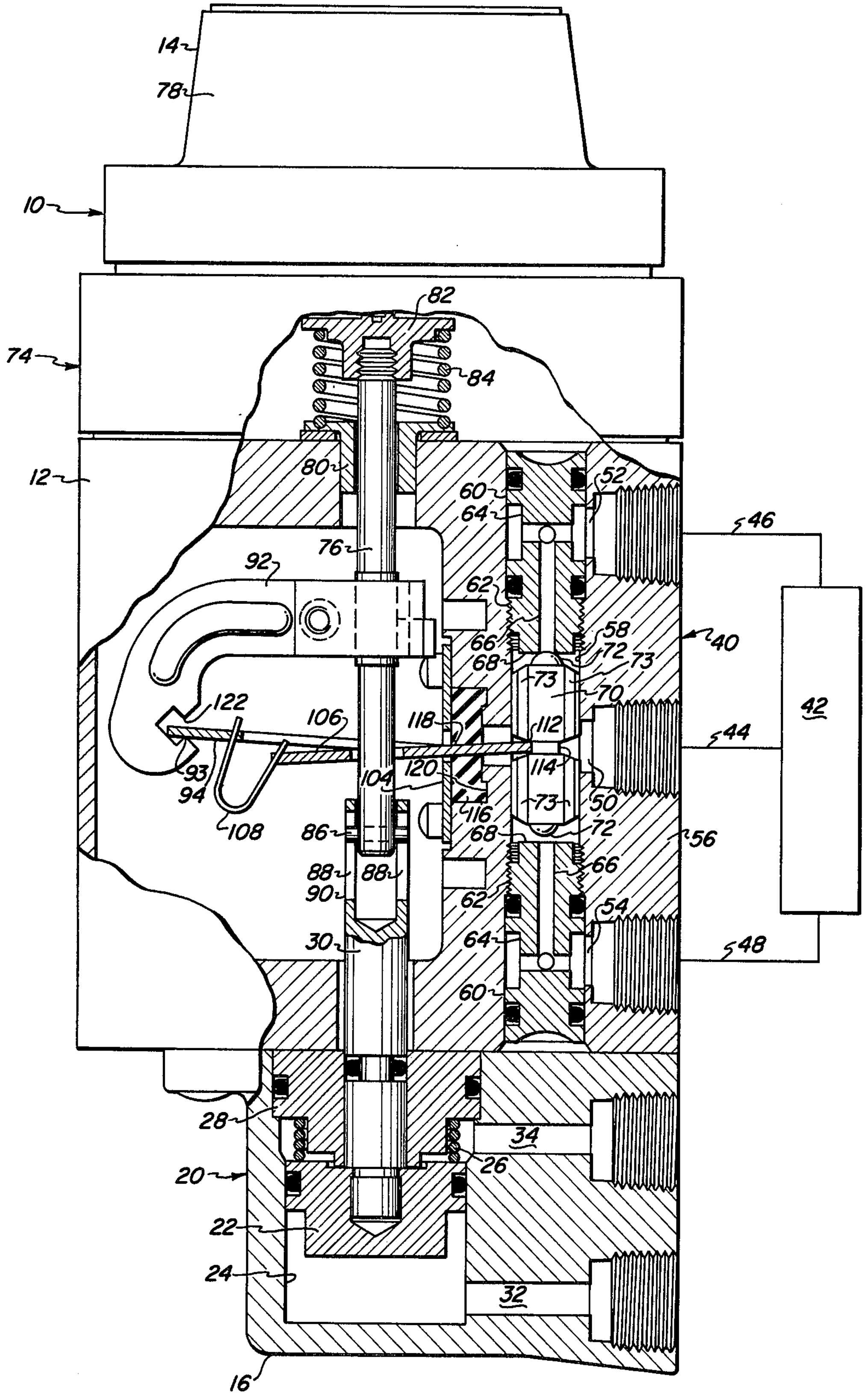
FIG. 3 is an elevational view similar to FIGS. 1 and 2, but with the component parts in a still different operating position.

In the configuration illustrated in FIGS. 1 to 3, timing device 10 is to operate a fluid valve to either open or close a fluid circuit after the lapse of a predetermined interval of time following activation of actuator 20 to move piston 22 from the lower or rest position seen in FIG. 1 to the upper or activated position seen in FIGS. 2 and 3.

The fluid valve is shown at 40 and may be connected into a fluid circuit 42 through a common leg 44, illustrated as an input leg, and either one or both of alternate legs 46 and 48, illustrated as output legs, of the fluid circuit. Input leg 44 is thus connected to valve 40 at a first passage 50, which, in this instance, constitutes an inlet passage, while output legs 46 and 48 can be connected at alternate second passages 52 and 54, which, in this instance, would constitute outlet passages, in the valve body 56. Valve body 56 includes a valve chamber, shown in the form of a longitudinally extending cylindrical bore 58, and the passages 50, 52 and 54 communicate with the bore 58. A valve seat 60 is affixed within valve body 56 at each end of the bore 58, preferably by means of threaded connections at 62. Each valve seat 60 includes an annular groove 64 communicating with a respective second passage 52 or 54 and an internal conduit 66 extending between annular groove 64 and a seating portion in the form of seating end 68 of the valve seat 60.

A shuttle 70 is placed in the bore 58 and has an external configuration, portions of which are complementary to the bore to enable the shuttle to slide upwardly and downwardly within the bore. The shuttle 70 carries a sealing member in the form of a ball 72 of elastomeric material at each end of the shuttle, each ball 72 being in such axial alignment with each conduit 66 at seating end 68 of each valve seat 60 so that a ball 72 is seated against one or the other of the seats 60 to close the respective conduit 66. In the lower position of the shuttle, as seen in FIGS. 1 and 2, the lower ball 72 is seated against the lower valve seat 60 to close the conduit 66 therein, and thereby close communication between second passage 54 and the chamber provided by bore 58. At the same time, communication between first passage 50 and second passage 52 remains open, via conduit 66 in the upper valve seat 60, bore 58 and longitudinal channels 73 in the external surface of shuttle 70 (also see FIG. 4).

Timing device 10 employs a time-delay mechanism, shown in the form of a pneumatic timing mechanism 74 at the upper end of device 10. Timing mechanism 74 is of a type now well-known in the art. A very similar pneumatic timing mechanism is described in U.S. Pat. No. 3,599,131, issued on Aug. 10, 1971, to Flanagan et al. A motion transmitting member in the form of a spindle 76 extends downwardly from timing mechanism 74 and it is the function of the timing mechanism to move spindle 76 from a lowermost location, as seen in FIG. 1, to an uppermost location, as seen in FIG. 3, at a timed rate of movement so that the elapsed timing during such movement of spindle 76 corresponds to a selected time-delay interval. The duration of the interval is selected by setting a dial 78 at the top of the timing mechanism 74.

Spindle 76 passes through a bushing 80 and is affixed at its upper end to a collar 82, which is a part of the timing mechanism 74. A helical spring 84 biases the collar 82 and spindle 76 upwardly. The pneumatic arrangement in timing mechanism 74 enables upward movement of collar 82 and, therefore, spindle 76 from the lowermost location at a selected rate while permitting downward movement of the lowermost location, against the bias of spring 84, at an unrestricted rate. At its lower end, spindle 76 is coupled to actuator rod 30 by means of a yoke arrangement which includes a pin 86 affixed to the spindle 76 and passing through a pair of opposed longitudinal slots 88 in a sleeve-like portion 90 of the actuator rod 30. In the position of the parts illustrated in FIG. 1, the downward biasing force of spring 26 upon piston 22 maintains the piston and actuator rod 30 in the downward position and holds spindle 76 in the lowermost location, against the upward bias of spring 84, by virtue of the engagement of pins 86 with the uppermost ends of slots 88.

Upon activation of timing device 10, as seen in FIG. 2, fluid (in this instance air) is introduced into cylinder 24 of actuator 20 through inlet port 32 under pressure so as to raise piston 22 against the bias of spring 26 and thereby actuate rod 30 to move the rod to an uppermost position, as illustrated in FIG. 2. Such upward movement of rod 30 takes place almost instantaneously and frees the spindle 76 for upward movement, in response to the upward bias of spring 84, at a predetermined rate, the pin 86 now being able to move upwardly within slots 88 in rod 30.

Figure 4:
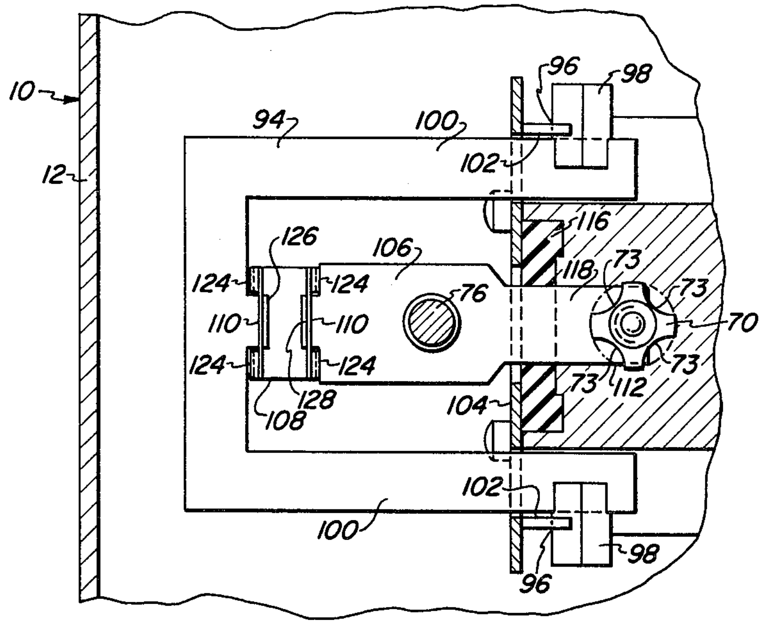
FIG. 4 is a fragmentary cross-sectional view taken along line 4—4 of FIG. 1.
Figure 5:
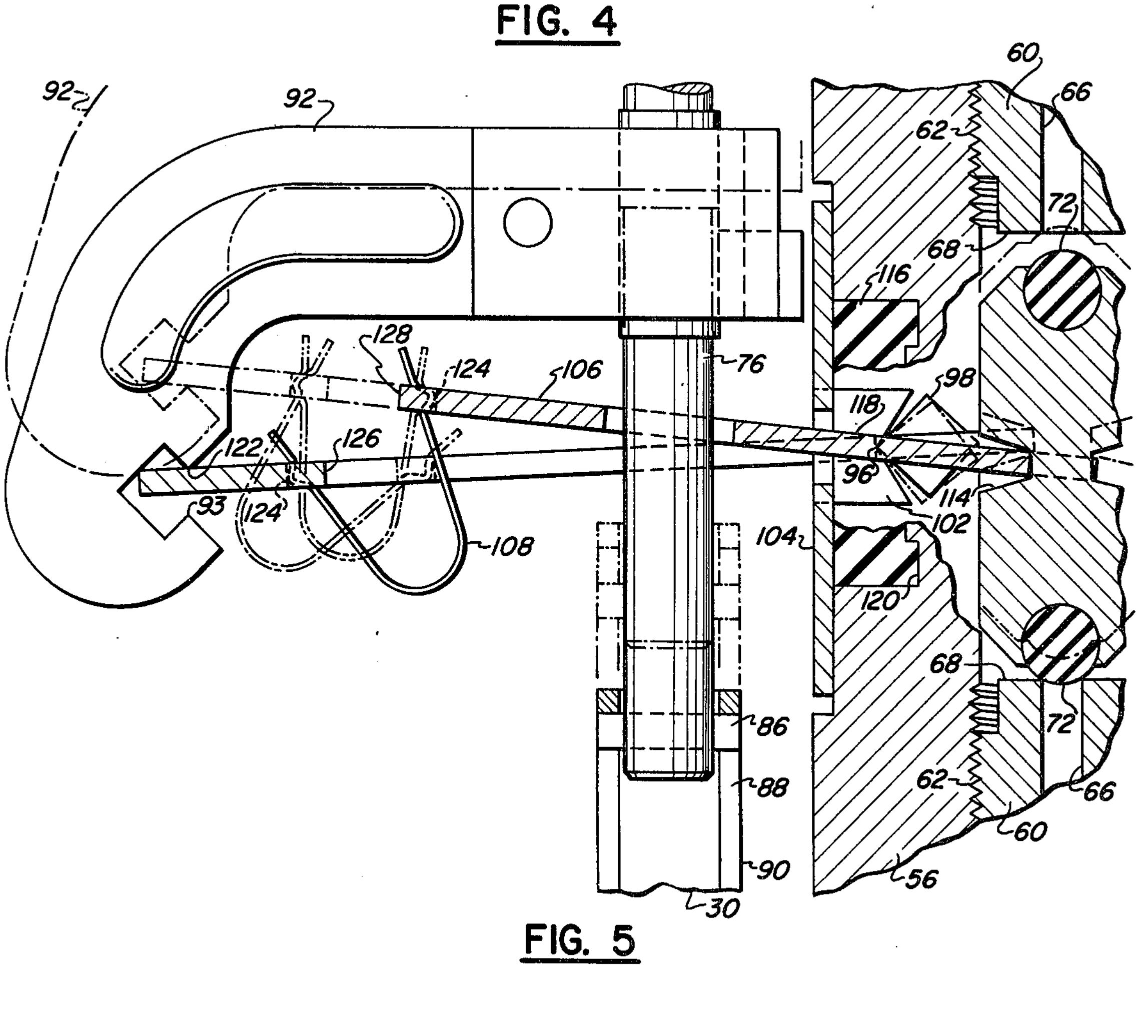
FIG. 5 is an enlarged fragmentary cross-sectional view of a portion of the timing device as shown in FIGS. 1 to 3.

As best seen in FIGS. 4 and 5, as well as in FIGS. 1 to 3, as spindle 76 moves upwardly a trip means, shown in the form of an arm 92 carried by the spindle 76 and projecting laterally therefrom, also moves upwardly at the same rate of movement. A first, or lower bearing edge 93 on arm 92 preferably has a knife-edge configuration and engages a U-shaped toggle lever 94 to swing the toggle lever in a clockwise direction, as viewed in FIG. 5, about knife-edge pivots provided at 96 by pivot blocks 98 affixed to extremities 100 of the toggle lever 94 and seated in V-shaped bearing blocks 102, carried by a plate 104 affixed to the frame 12 of the device 10. Toggle lever 94 is coupled to a valve-operating lever 106 by means of an over-center or snap-action toggle spring 108 which has a U-shaped configuration and includes a pair of opposed legs 110, one of which legs 110 engages the toggle lever 94 and the other one of which legs 110 engages the valve-operating lever 106. Valve-operating lever 106 extends through the wall of the valve body 56 and terminates within the valve 40 at a bifuricated end 112 which engages shuttle 70 within an annular recess 114 in the shuttle. Lever 106 is held in place by a support block 116 of elastomeric material which surrounds intermediate portion 118 of lever 106 and is seated in a cavity 120 within the wall of the valve body 56. The resilient, flexible nature of the material of block 116 allows lever 106 to swing about an axis perpendicular to the plane of the paper, as viewed in FIGS.

1 to 3 and 5, while intimate contact between the material of block 116 and portion 118 of lever 106 serves as a seal which seals the valve body against leakage along the lever 106 between the valve chamber provided by bore 58 and the exterior of the valve. Block 116 is retained within cavity 120 by plate 104 and preferably is placed under compression within the cavity so as to assure intimate sealing contact between the block 116 and portion 118 of lever 106. In order to simplify construction, as well as to assure proper sealing and effective operation, block 116 may be molded around portion 118 to fabricate an integral lever 106 and block 116 assembly.

Continued upward movement of spindle 76 and concomitant upward movement of arm 92 will swing toggle lever 94 and toggle spring 108 to a dead-center position relative to the valve-operating lever 106, which is held stationary by the support block 116, as seen in FIG. 2. As soon as toggle lever 94 moves beyond the dead-center position, toggle spring 108 will swing valve-operating lever 106 in a counterclockwise direction, as viewed in FIG. 3, with a relatively quick, snap-action to immediately move shuttle 70 from the first or lowermost position, seen in FIG. 1, to the second or uppermost position, seen in FIG. 3. Such movement of the shuttle will seat the upper ball 72 against the seating end 68 of the upper valve seat 60 to close the conduit 66 therein, and thereby close communication between second passage 52 and the chamber provided by bore 58, thus closing off communication between first passage 50 and second passage 52. At the same time, communication between first passage 50 and second passage 52 is opened. In this manner, valve 40 operates to switch the fluid circuit 42 to change the communication between common leg 44 of the circuit and the alternate legs 46 and 48. Because valve seats 60 are threaded into valve body 56, the valve seats may be adjusted longitudinally to position seating ends 68 relative to shuttle 70 for optimum performance. Thus, the toggle lever 94, valve-operating lever 106 and toggle spring 108, together with the knife-edge bearing means provided by the knife-edge pivots at 96 and support block 116, provide a snap-action mechanism for moving the shuttle 70 to actuate valve 40 rapidly in response to the relatively slower movement of spindle 76 at the expiration of a predetermined timed interval following activation of timing device 10.

Upon deactivation of timing device 10, the working fluid in cylinder 24 is released to permit the piston 22 to move downwardly, under the biasing force of spring 26, thereby moving actuator rod 30 downwardly until the yoke provided by slots 88 in portion 90 of rod 30 engage pin 86 in spindle 76 and pull spindle 76 downwardly until the component parts return to the initial position illustrated in FIG. 1. Since the timing mechanism 74 does not impede downward movement of spindle 74, such movement can occur rapidly. The rapid downward movement of spindle 76 brings arm 92 rapidly downward so that a second, or upper knife-edge bearing edge 122 on the arm engages the toggle lever 94 to swing the lever counterclockwise, as viewed in FIGS. 1 to 3 and 5, back through the dead-center position, and operate the toggle spring 108 and valve-operating lever 106 so as to quickly return the shuttle 70 back to the lower position.

Figure 6:
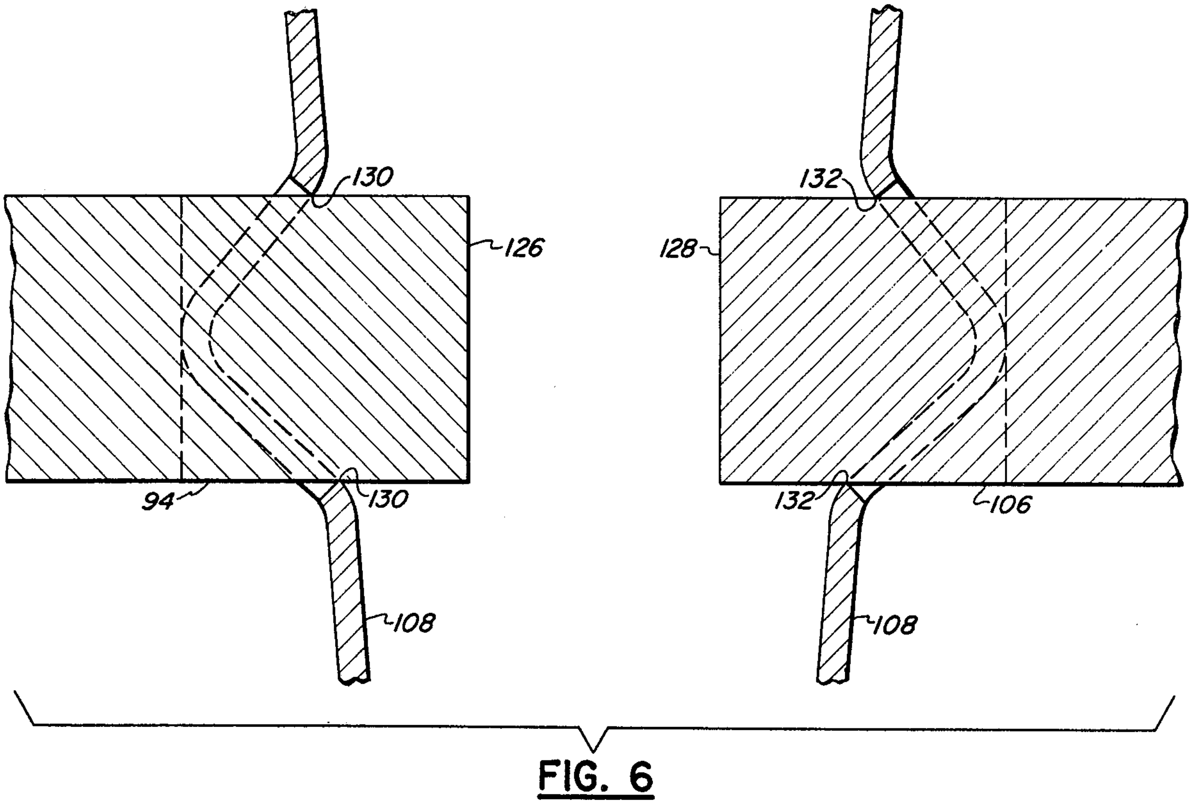
FIG. 6 is a further enlarged fragmentary cross-sectional view of a portion of the timing device as shown in FIG. 5.

In order to facilitate operation of valve 40 in the snap-action fashion described above, several features have been provided in the arrangement of toggle lever 94, valve-operating lever 106, and toggle spring 108. The U-shaped configuration of toggle lever 94 provides a relatively long lever arm between the knife-edge pivots at 96 and the bearing edges 93 and 122 of the arm 92 carried by spindle 76, while enabling a compact arrangement which allows for a relatively long valve-operating lever 106. In addition, as best seen in FIGS. 4 to 6, toggle spring 108 is provided with arcuate bearing surfaces 124 which engage the toggle lever 94 and the valve-operating lever 106 at the sides of the tabs 126 and 128 which are integral with toggle lever 94 and valve-operating lever 106, respectively, and which pass through the toggle spring to secure the toggle spring in place. These arcuate bearing surfaces 124 assure that the toggle spring 106 is in rolling contact with the levers 94 and 106 during the swinging movements, as seen in the various positions illustrated in phantom in FIG. 5, to further reduce frictional forces in the snap-action mechanism. Further, as best seen in FIG. 6, toggle spring 108 is provided with opposed knife-edge bearing edges 130 engaging tab 126 of toggle lever 14 and opposed knife-edge bearing edges 132 engaging tab 128 of valve-operating lever 106. The combination of the long lever arms, together with the low-friction pivots provided by knife-edge pivots at 96, the knife-edge bearing edges 93, 122, 130 and 132 and the resilient nature of support block 116, and the rolling engagement of the toggle spring, reduces to a minimum the force which must be exerted by the moving spindle 76 to operate the valve 40. Thus, the timing mechanism 74 can operate effectively to provide an accurately measured time-delay interval.

Figure 7:
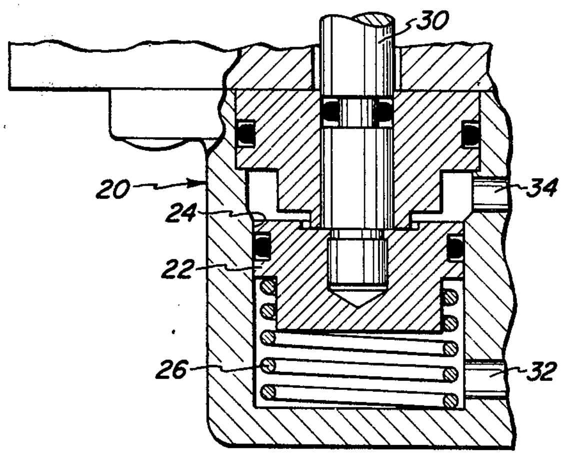
FIG. 7 is a fragmentary cross-sectional view of a portion of the timing device with certain component parts re-arranged for an alternate operating mode.

Turning now to FIG. 7, where it is desired to actuate valve 40 upon the expiration of an interval of time measured from the deactivation of timing device 10, rather than from activation of the device 10 as described above, the location of spring 26 is changed from between the piston 22 and gland 28 to below the piston 22, as illustrated in FIG. 7. In this manner, spring 26 exerts an upwardly directed biasing force upon the piston 22. However, upward movement of the piston 22 in response to the biasing force of spring 26 is resisted by the presence of a working fluid introduced into cylinder 24 above the piston 22, via the alternate port 34. Thus, as long as the timing device 10 remains activated; that is, as long as working fluid under pressure is maintained in the cylinder 24 above the piston 22, the timing mechanism 74, spindle 76 and valve 40 will remain in the positions illustrated in FIG. 1.

Upon deactivation of timing device 10; that is, upon release of the working fluid from the cylinder 24 above the piston 22, spring 26 will immediately move piston 22 to the uppermost position of the piston, releasing the spindle 76 and enabling the timing mechanism 74 to operate so as to move spindle 76 upwardly toward the uppermost location thereof and actuate valve 40, all as described hereinabove. Hence, valve 40 will be actuated following the expiration of a predetermined timed interval measured from deactivation of the timing device 10.

It is noted that the illustrated embodiment employs a fluid-operated timing mechanism to actuate fluid valve in response to activation or deactivation of a fluid actuator. Since all of the components are operated by fluid, or handle a fluid, no electrical devices are required. Thus, timing device 10 is well-suited to installations where electrical components would introduce a hazard. Moreover, since the interior of valve 40 is completely isolated from the interior of the timing mechanism 74, and the interior of fluid actuator 20 is likewise isolated, there will be no contamination of one fluid by another. Therefore, valve 40 can be employed to handle corrosive, flammable or otherwise dangerous fluids which would not contaminate the fluid which operates the device or the timing mechanism and which may be exhausted to the surrounding areas. Of course, where no hazard would exist, fluid actuator 20 could be replaced with an electrical actuator such as a solenoid.

It is to be understood that the above detailed description of an embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A fluid valve for use in a timing device in which the fluid valve is actuated upon the expiration of a prescribed timed interval following a given event, said fluid valve comprising:

a valve body having a chamber and a wall between the chamber and the exterior of the valve;

first and second passages communicating with the chamber;

a shuttle in the chamber movable between a first position, wherein the shuttle closes communication between one of said first and second passages and the chamber, and a second position wherein communication is open between both said first and second passages and the chamber;

a snap-action mechanism isolated from the fluid valve by the wall between the chamber and the exterior of the fluid, said snap-action mechanism including a first lever extending through the wall, said first lever having a first end engaging the shuttle within the chamber, a second end outside the chamber and an intermediate portion through the wall; and a member of resiliently flexible material in said wall engaging the intermediate portion of said first lever to enable swinging movement of the first lever relative to the wall, said member of resiliently flexible material maintaining a seal between the chamber and the exterior of the valve at the location where the intermediate portion passes through the wall whereby said snap-action mechanism is isolated from the fluid valve in a fluid-tight manner; and wherein the snap-action mechanism includes a second lever having first and second ends; pivotal means mounting the second lever adjacent the first end thereof for pivotal movement relative to the frame and relative to the first lever; a snap-action spring coupling the first and second levers adjacent the second ends thereof; and a trip means engaging the second end of the second lever, the trip means being adaptable for movement thereof to effect displacement of the second lever and the snap-action spring relative to the first lever, the displacement of the second lever and the snap-action spring causing a swinging movement of the first lever and movement of the shuttle between the first and second position in response to the swinging movement of the first lever.

2. The invention of claim 1 wherein:

the valve body includes a cavity at the location where the intermediate portion of the first lever passes through the wall; and the member of resiliently flexible material comprises a block of elastomeric material placed around the intermediate portion of the first lever and secured within the cavity.

3. The invention of claim 2 wherein the block of elastomeric material is secured within the cavity under compression.

4. The invention of claim 3 wherein said pivotal means mounting the second lever for pivotal movement comprises knife-edge bearing means.

5. The invention of claim 3 wherein the snap-action spring includes a first arcuate surface engaging said first lever and a second arcuate surface engaging said second lever such that the snap-action spring makes rolling contact with the first and second levers as the levers are moved relative to one another.

6. The invention of claim 5 wherein the snap-action spring has a U-shaped configuration including opposite legs, said arcuate surfaces being located on said opposite legs.

7. A fluid valve for use in a timing device in which the fluid valve is actuated upon the expiration of a prescribed timed interval following a given event, said fluid valve comprising:

a valve body having a chamber and a wall between the chamber and the exterior of the valve;

first and second passages communicating with the chamber;

a shuttle in the chamber movable between a first position, wherein the shuttle closes communication between one of said first and second passages and the chamber, and a second position wherein communication is open between both said first and second passages and the chamber;

a snap-action mechanism isolated from the fluid valve by the wall between the chamber and the exterior of the fluid, said snap-action mechanism including a first lever extending through the wall, said first lever having a first end engaging the shuttle within the chamber, a second end outside the chamber and an intermediate portion passing through the wall; and a member of resiliently flexible material in said wall and engaging the intermediate portion of said first lever to enable swinging movement of the first lever relative to the wall, said member of resiliently flexible material maintaining a seal between the chamber and the exterior of the valve at the location where the intermediate portion passes through the wall whereby said snap-action mechanism is isolated from the fluid valve in a fluid-tight manner, wherein the snap-action mechanism includes a second lever having first and second ends; pivotal means mounting the second lever, adjacent the first end thereof, for pivotal movement relative to the frame and relative to the first lever; and a snap-action spring coupling the first and second levers adjacent the second ends thereof wherein the snap-action spring includes knife-edge bearing edges engaging each of said first and second levers.

* * * * *